(12) United States Patent
Suzuki et al.

(10) Patent No.: US 10,717,486 B2
(45) Date of Patent: Jul. 21, 2020

(54) SEAT FRAME FOR MOTORCYCLE

(71) Applicant: HONDA MOTOR CO., LTD., Tokyo (JP)

(72) Inventors: Shota Suzuki, Wako (JP); Takazumi Hayashi, Wako (JP); Yoshiki Higashijima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/363,073

(22) Filed: Mar. 25, 2019

(65) Prior Publication Data

US 2019/0300087 A1 Oct. 3, 2019

(30) Foreign Application Priority Data

Mar. 28, 2018 (JP) ................................ 2018-062299

(51) Int. Cl.
| | | |
|---|---|---|
| *B62J 1/08* | (2006.01) | |
| *B62K 19/10* | (2006.01) | |
| *B62K 11/02* | (2006.01) | |

(52) U.S. Cl.
CPC ............... *B62J 1/08* (2013.01); *B62K 11/02* (2013.01); *B62K 19/10* (2013.01)

(58) Field of Classification Search
CPC ............. B62J 1/08; B62K 11/02; B62K 19/10
USPC ....................................................... 297/195.1
See application file for complete search history.

(56) References Cited

U.S. PATENT DOCUMENTS

| | | | | | |
|---|---|---|---|---|---|
| 5,375,677 | A | * | 12/1994 | Yamagiwa | B62K 11/04 180/219 |
| 5,480,001 | A | * | 1/1996 | Hara | B62K 11/04 180/219 |
| 5,845,728 | A | * | 12/1998 | Itoh | B62K 11/04 180/219 |

(Continued)

FOREIGN PATENT DOCUMENTS

| | | |
|---|---|---|
| JP | 2000-053058 A | 2/2000 |
| JP | 2004-299464 A | 10/2004 |

(Continued)

OTHER PUBLICATIONS

German Office Action for German Application No. 102019203611.2, dated Nov. 21, 2019, with English translation.

(Continued)

*Primary Examiner* — Mark R Wendell
(74) *Attorney, Agent, or Firm* — Birch, Stewart, Kolasch & Birch, LLP

(57) ABSTRACT

A seat frame for a motorcycle includes a plurality of aluminum parts manufactured with different manufacturing methods. A seat frame includes front members, middle members, and a rear member, the front members, the middle members, and the rear member being formed of aluminum. The rear member is formed by integral molding based on a gravity casting method. The rear member includes a pair of left and right rail portions, a front cross portion, a rear cross portion, and a plurality of attachment bosses for attaching other parts. The left and right rail portions each have an attachment portion to be connected to a rear end portion of corresponding one of the middle members provided on an end portion thereof on the front side in the vehicle longitudinal direction.

10 Claims, 8 Drawing Sheets

(56) References Cited

U.S. PATENT DOCUMENTS

| | | | |
|---|---|---|---|
| 6,416,072 B1 | 7/2002 | Mochizuki et al. | |
| 6,796,030 B2 | 9/2004 | Mochizuki et al. | |
| 8,453,781 B2* | 6/2013 | Kawai | B60T 8/3685 |
| | | | 180/219 |
| 2002/0059728 A1* | 5/2002 | Mochizuki | B21D 53/86 |
| | | | 29/897.2 |
| 2002/0148665 A1* | 10/2002 | Yagisawa | B62K 19/46 |
| | | | 180/219 |
| 2005/0051374 A1* | 3/2005 | Nakano | B62J 15/00 |
| | | | 180/219 |
| 2006/0283650 A1* | 12/2006 | Kawamura | B62K 11/04 |
| | | | 180/227 |
| 2009/0166119 A1* | 7/2009 | Susaki | B62K 11/04 |
| | | | 180/219 |
| 2009/0230654 A1* | 9/2009 | Yuliang | B62J 25/00 |
| | | | 280/281.1 |
| 2011/0147561 A1* | 6/2011 | Koda | B62J 1/08 |
| | | | 248/429 |
| 2014/0361512 A1* | 12/2014 | Ishida | B62K 25/20 |
| | | | 280/284 |
| 2016/0236740 A1* | 8/2016 | Chipp | B62J 1/12 |
| 2017/0101151 A1* | 4/2017 | Koishikawa | B62J 1/08 |

FOREIGN PATENT DOCUMENTS

| | | |
|---|---|---|
| JP | 2006-240345 A | 10/2004 |
| JP | 2005-29131 A | 2/2005 |

OTHER PUBLICATIONS

Japanese Office Action for Japanese Application No. 2015-062299, dated Oct. 30, 2019, with an English translation.

\* cited by examiner

US 10,717,486 B2

SEAT FRAME FOR MOTORCYCLE

TECHNICAL FIELD

The present invention relates to a seat frame for a motorcycle, and particularly to a seat frame for a motorcycle configured by combining a plurality of metal parts with one another.

BACKGROUND ART

There has been known a method of configuring a vehicle body frame for a motorcycle by welding a plurality of metal parts manufactured in different manufacturing methods to one another.

Patent Document 1 discloses a vehicle body frame for a motorcycle configured by welding a head pipe formed of an aluminum gravity-die-cast material, a main pipe formed of an aluminum extruded material, and a pivot plate formed of an aluminum die cast material to one another.

PRIOR ART DOCUMENT

Patent Document

Patent Document 1: Japanese Patent Laid-Open No. 2000-53058

SUMMARY OF THE INVENTION

Problem to be Solved by the Invention

In the vehicle body frame disclosed in Patent Document 1, it is set which part is manufactured by which method in accordance with required performances such as strength, weight, appearance, accuracy, manufacturing cost, and the like. Although it is conceivable that a seat frame coupled to a rear portion of the vehicle body frame and supporting front and rear seats, a pannier, and the like is also configured by combining a plurality of parts manufactured in different manufacturing methods with one another, Patent Document 1 does not discuss a seat frame.

It is an object of the present invention to provide a seat frame for a motorcycle including a plurality of aluminum parts manufactured in different manufacturing methods.

Solution to Problems

To achieve the afore-mentioned object, the present invention has a first feature in a seat frame (SF) for a motorcycle (1) including a plurality of parts connected to one another to form an integral structure and mounted to a rear portion of a vehicle body frame (F), the seat frame (SF) comprising front members (S1) disposed on a front side in a vehicle longitudinal direction, middle members (S2) connected to rear portions of the front members (S1), and a rear member (S3) connected to rear portions of the middle members (S2), wherein the front members (S1), the middle members (S2), and the rear member (S3) are formed of aluminum members manufactured in different manufacturing methods.

The present invention has a second feature in that the rear member (S3) is formed by integral molding based on a gravity casting method, the rear member (S3) includes a pair of left and right rail portions (71) extending in the vehicle longitudinal direction, a front cross portion (72) extending in a vehicle widthwise direction on the front side in the vehicle longitudinal direction and connecting the left and right rail portions (71), a rear cross portion (73) extending in the vehicle widthwise direction on a rear side in the vehicle longitudinal direction and connecting the left and right rail portions (71), and a plurality of attachment bosses (80, 81, 82, 83, 84, 85, 86, 87) for attaching other parts, and attachment portions (90, 91) to be connected to rear end portions of the middle members (S2) are provided on end portions on a front side in the vehicle longitudinal direction of the left and right rail portions (71).

The present invention has a third feature in that the middle members (S2) include upper middle members (50) arranged in a left-right pair in the vehicle widthwise direction, and lower middle members (51) arranged in a left-right pair in the vehicle widthwise direction, the attachment portions (90, 91) disposed on the rail portions (71) of the rear member (S3) include a pair of left and right upper attachment portions (90) mounted to the upper middle members (50), and a pair of left and right lower attachment portions (91) mounted to the lower middle members (51), and the upper attachment portions (90) are positioned closer to the rear side in the vehicle longitudinal direction compared to the lower attachment portions (91).

The present invention has a fourth feature in that the upper attachment portions (90) are positioned inside the lower attachment portions (91) in the vehicle widthwise direction.

The present invention has a fifth feature in that the middle members (S2) are formed of a pipe member obtained as a result of extruding or drawing, the upper middle members (50) are longer than the lower middle members (51), the upper middle member (50) and the lower middle member (51) are oriented in the vehicle longitudinal direction such that a vertical distance therebetween decreases toward the rear side of a vehicle body in a vehicle side view, the upper middle members (50) have rear end portions (50b) connected to the upper attachment portions (90) of the rear member (S3), the lower middle members (51) have rear end portions (51b) connected to the lower attachment portions (91) of the rear member (S3), the upper middle members (50) have front end portions (50a) mounted to pivot frames (F3) of the vehicle body frame (F), and the lower middle members (51) have front end portions (51a) connected to the front members (S1).

The present invention has a sixth feature in that the front members (S1) are a pair of left and right elongate members obtained as a result of cold forging or hot forging, rear connection protrusions (65) inserted into the front end portions (51a) of the lower middle members (51) are formed at rear end portions of the front members (S1), and the front members (S1) have front end portions (62) mounted to the pivot frames (F3) by fastening members (38).

The present invention has a seventh feature in that the seat frame (SF) includes first vertical cross members (41) vertically connecting the upper middle members (50) and the lower middle members (51), second vertical cross members (42) vertically connecting the front members (S1) and the upper middle members (50), and a horizontal cross member (40) oriented in the vehicle widthwise direction and connecting the left and right front members (S1), and the first vertical cross members (41), the second vertical cross members (42), and the horizontal cross member (40) are each formed of a pipe member.

The present invention has an eighth feature in that inside connection protrusions (66) inserted into end portions of the horizontal cross member (40) are formed on inside surfaces in the vehicle widthwise direction of the front members (S1), and upper connection protrusions (64) inserted to end portions of the second vertical cross members (42) are formed on upper surfaces of the front members (S1).

The present invention has an ninth feature in that attachment portions (63) for pillion footstep holders (31) are provided on lower surfaces of the front members (S1).

Effects of the Invention

According to the first characteristic, in a seat frame (SF) for a motorcycle (1) including a plurality of parts connected to one another to form an integral structure and mounted to a rear portion of a vehicle body frame (F), the seat frame (SF) comprising front members (S1) disposed on a front side in a vehicle longitudinal direction, middle members (S2) connected to rear portions of the front members (S1), and a rear member (S3) connected to rear portions of the middle members (S2), wherein the front members (S1), the middle members (S2), and the rear member (S3) are formed of aluminum members manufactured in different manufacturing methods. Therefore, the seat frame satisfying required performances such as strength, weight, appearance, accuracy, manufacturing cost, and the like according to application places can be obtained.

According to the second characteristic, the rear member (S3) is formed by integral molding based on a gravity casting method, the rear member (S3) includes a pair of left and right rail portions (71) extending in the vehicle longitudinal direction, a front cross portion (72) extending in a vehicle widthwise direction on the front side in the vehicle longitudinal direction and connecting the left and right rail portions (71), a rear cross portion (73) extending in the vehicle widthwise direction on a rear side in the vehicle longitudinal direction and connecting the left and right rail portions (71), and a plurality of attachment bosses (80, 81, 82, 83, 84, 85, 86, 87) for attaching other parts, and attachment portions (90, 91) to be connected to rear end portions of the middle members (S2) are provided on end portions on a front side in the vehicle longitudinal direction of the left and right rail portions (71). Therefore, the required performance for the rear member can be satisfied by manufacturing the rear member based on the gravity casting method. Specifically, in the gravity casting method in which molten aluminum is poured into a mold by gravity, the pouring speed is low, whereby gas is prevented from being entrained into the aluminum, which is suitable for producing a part with a complex shape by integral molding. In the rear member positioned at a rear end of the seat frame, it is necessary to arrange attachment bosses for attaching parts such as a rear fender, a rear carrier, and a seat catch with high accuracy while securing a sufficient strength for supporting weights of an occupant seated on a rear seat, a pannier, and the like. It is therefore preferable to manufacture the rear member by the gravity casting method.

Since the gravity casting method increases accuracy in forming the attachment portions, the middle members can be positioned with high accuracy when connected by welding.

According to the third characteristic, the middle members (S2) include upper middle members (50) arranged in a left-right pair in the vehicle widthwise direction, and lower middle members (51) arranged in a left-right pair in the vehicle widthwise direction, the attachment portions (90, 91) disposed on the rail portions (71) of the rear member (S3) include a pair of left and right upper attachment portions (90) mounted to the upper middle members (50), and a pair of left and right lower attachment portions (91) mounted to the lower middle members (51), and the upper attachment portions (90) are positioned closer to the rear side in the vehicle longitudinal direction compared to the lower attachment portions (91). Therefore, the upper attachment portions are disposed on a rear side compared to the lower attachment portions, and therefore the weight of an upper portion of the rear member can be reduced. Further, since the upper middle members are long in total length, a vibration can be absorbed by deflection of the upper middle members to be suppressed from being transmitted to seats, thereby enhancing ride comfort.

According to the fourth characteristic, the upper attachment portions (90) are positioned inside the lower attachment portions (91) in the vehicle widthwise direction. Therefore, a horizontal distance between the left and right upper middle members is smaller than a horizontal distance between the left and right lower middle members, and therefore, a rider can straddle a seat more easily and the legs can reach the ground more easily.

According to the fifth characteristic, the middle members (S2) are formed of a pipe member obtained as a result of extruding or drawing, the upper middle members (50) are longer than the lower middle members (51), the upper middle member (50) and the lower middle member (51) are oriented in the vehicle longitudinal direction such that a vertical distance therebetween decreases toward the rear side of a vehicle body in a vehicle side view, the upper middle members (50) have rear end portions (50b) connected to the upper attachment portions (90) of the rear member (S3), the lower middle members (51) have rear end portions (51b) connected to the lower attachment portions (91) of the rear member (S3), the upper middle members (50) have front end portions (50a) mounted to pivot frames (F3) of the vehicle body frame (F), and the lower middle members (51) have front end portions (51a) connected to the front members (S1). Therefore, required performances for the middle members can be satisfied by manufacturing the middle members with pipe members. Specifically, since a pipe member obtained as a result of extruding or drawing can be mass produced with low manufacturing cost, it is suitably used for an elongate part having a uniform cross section. The middle members have increased strength because of its truss structure and the like, and vibrations are absorbed by deflection of the elongate portions, for example. Accordingly, the middle members are preferably formed of pipe members.

According to the sixth characteristic, the front members (S1) are a pair of left and right elongate members obtained as a result of cold forging or hot forging, rear connection protrusions (65) inserted into the front end portions (51a) of the lower middle members (51) are formed at rear end portions of the front members (S1), and the front members (S1) have front end portions (62) mounted to the pivot frames (F3) by fastening members (38). Therefore, required performances for the front members can be satisfied by manufacturing the front members with forgings. Specifically, a forging obtained as a result of cold forging or hot forging is suitably used for a part requiring high strength and toughness. The front members supporting loads at front lower portions of the seat frame are preferably formed of forgings. Since forgings also offer high formation accuracy, which leads to increased accuracy in forming the rear connection protrusions, the middle members are positioned with increased accuracy when connected by welding. Further, since forgings having smooth surfaces are superior also in appearance, the motorcycle can have an appearance of high quality by exposing the front members externally.

According to the seventh characteristic, the seat frame (SF) includes first vertical cross members (41) vertically connecting the upper middle members (50) and the lower middle members (51), second vertical cross members (42) vertically connecting the front members (S1) and the upper middle members (50), and a horizontal cross member (40) oriented in the vehicle widthwise direction and connecting the left and right front members (S1), and the first vertical cross members (41), the second vertical cross members (42), and the horizontal cross member (40) are each formed of a pipe member. Therefore, it is possible to suppress an increase in weight by using pipe members while enhancing the rigidity of the seat frame by connecting the front members to each other, connecting the middle members to each other, and connecting the front member and the middle member to each other.

According to the eighth characteristic, inside connection protrusions (66) inserted into end portions of the horizontal cross member (40) are formed on inside surfaces in the vehicle widthwise direction of the front members (S1), and upper connection protrusions (64) inserted to end portions of the second vertical cross members (42) are formed on upper surfaces of the front members (S1). Therefore, provision of the connection protrusions on the front members having high strength enhances the positioning accuracy and the connection strength of the horizontal cross member and the second vertical cross members.

According to the ninth characteristic, attachment portions (63) for pillion footstep holders (31) are provided on lower surfaces of the front members (S1). Therefore, mounting the pillion footstep holders to the front members having high strength enhances the load resistance of the pillion footsteps.

MODES FOR CARRYING OUT THE INVENTION

Figure 1:
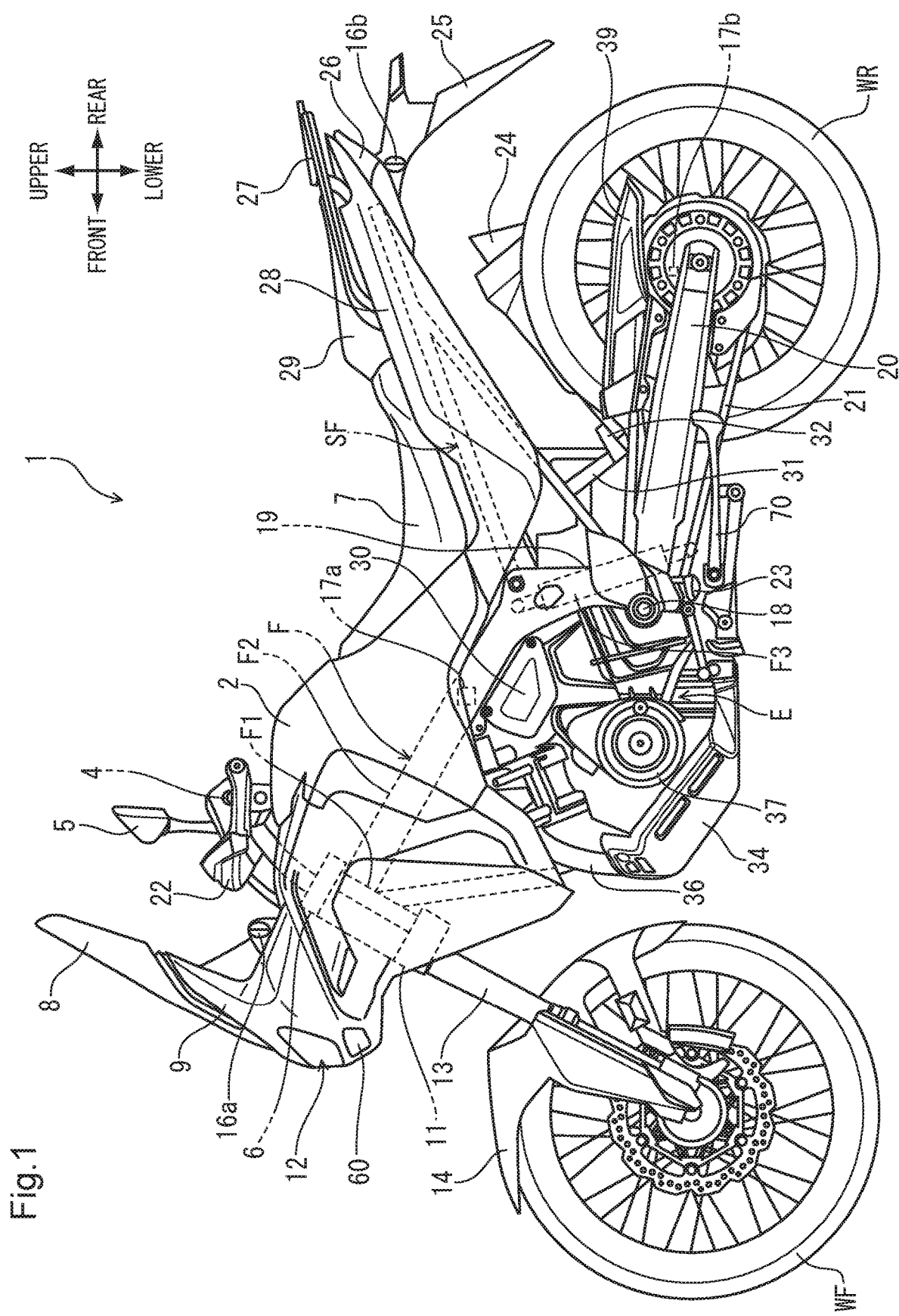
FIG. 1 is a left side view of a motorcycle to which a seat frame SF according to an embodiment of the present invention is applied.

FIG. 1 is a left side view of a motorcycle 1 to which a seat frame SF according to an embodiment of the present invention is applied. The motorcycle 1 is a dual-sport saddle type vehicle which travels by transmitting a driving force of an engine E as a power source via a drive chain 21 to a rear wheel WR. A pair of left and right main frames F2 configuring a vehicle body frame F have at their front end portions in a vehicle longitudinal direction a head pipe F1 pivotally supporting a steering shaft not depicted for swing motion. A front wheel WF is rotatably supported on a pair of left and right front forks 13 which are supported by a top bridge 6 and a bottom bridge 11 fixed to the steering shaft at upper and lower portions of the head pipe F1. A steering wheel 4 is fixed to the top bridge 6, and a pair of left and right rear-view mirrors 5 and a knuckle guard 22 are mounted to the steering wheel 4.

A front side of the steering wheel 4 is covered by a front cowl 9 which supports a headlight 12 and a screen 8. Between the front cowl 9 and the steering wheel 4, a pair of left and right front turn signal devices 16a are disposed. Below the headlight 12, a cornering light 60 is disposed which is turned on in accordance with a lean angle of the motorcycle 1 in cornering and irradiates a turning direction. The front forks 13 have a front fender 14 covering the front wheel WF from above fixed thereto.

The engine E is disposed below the main frames F2. Below the engine E, an undercover 34 is disposed for protecting front and lower portions of a crankcase 37 and an exhaust pipe 36. Combustion gas in the engine E is discharged from a muffler 24 on the right side in a vehicle widthwise direction via the exhaust pipe 36.

The main frames F2 have a pair of left and right pivot frames F3 coupled to rear end lower portions thereof, and the pivot frames F3 support a pivot 18 of a swing arm 20 rotatably supporting the rear wheel WR. The pivot 18 pivotally supports a front end portion of the swing arm 20 for swing motion. The swing arm 20 is suspended from the main frames F2 by a rear cushion 19 at a position behind the pivot 18. The pivot frames F3 have a pair of left and right foot steps 23 mounted to respective lower end portions thereof. Behind the foot step 23 on the left side in the vehicle widthwise direction, the side-stand 70 is pivotally supported for swing motion. The swing arm 20 has a chain cover 39 for covering the drive chain 21 from above mounted to an upper portion thereof.

In front of the pivot frames F3 and between the main frames F2 and the engine E, an electrical component box 30 for storing an in-vehicle battery and the like is disposed. Above the electrical component box 30 and between the left and right main frames F2, a lean angle sensor 17a detecting a lean angle of the vehicle body is disposed. In the proximity of an axle of the rear wheel WR, a vehicle speed sensor 17b detecting a vehicle speed on the basis of a rotational speed of the rear wheel WR is disposed.

The main frames F2 have a fuel tank 2 disposed at an upper portion thereof and a seat frame SF extending toward the rear upper side of the vehicle body coupled to rear portions thereof. The seat frame SF has a pair of left and right pillion footstep holders 31 supporting pillion footsteps 32 mounted to lower portions thereof.

Behind the fuel tank 2, a front seat 7 and a rear seat 29 supported by the seat frame SF are disposed. The seat frame SF is covered by a rear cowl 28 from outsides in the vehicle widthwise direction. Outside the rear seat 29 in the vehicle widthwise direction, a rear carrier 27 supported by the seat frame SF is disposed. Behind the rear cowl 28, a tail light device 26 and a rear fender 25 are disposed. The rear fender 25 has a pair of left and right rear turn signal devices 16b disposed at base portions thereof.

Figure 2:
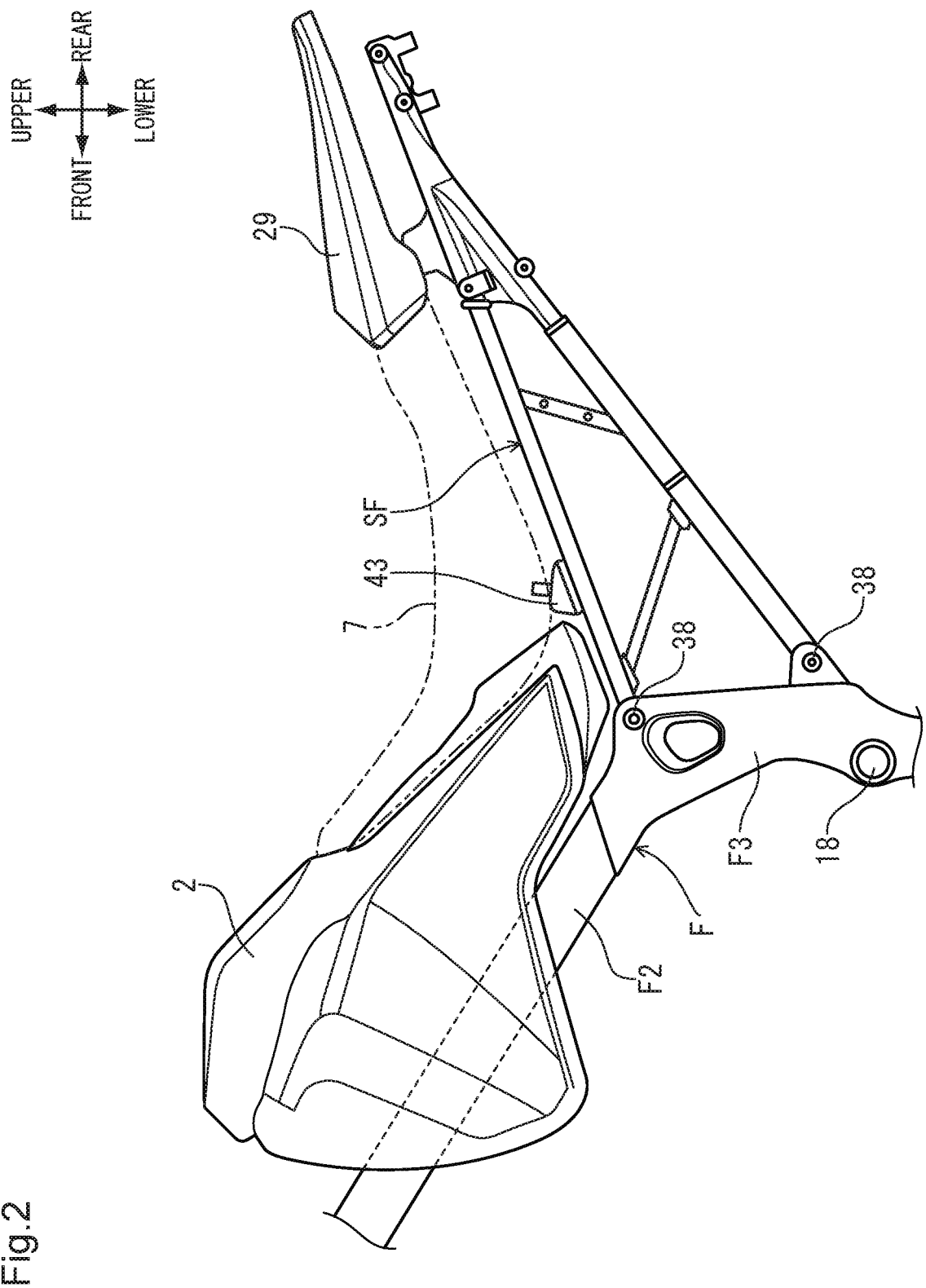
FIG. 2 is a left side view depicting the vehicle body frame F and a layout of peripheral components thereof.

FIG. 2 is a left side view depicting the vehicle body frame F and a layout of peripheral components thereof. The fuel tank 2 has a shape straddling the pair of left and right main frames F2 configuring the vehicle body frame F in the vehicle widthwise direction. The main frames F2 have the pair of left and right pivot frames F3 supporting the pivot 18 connected to rear end portions thereof. The seat frame SF configured by welding a plurality of aluminum parts to one another in an integral manner is mounted to rear portions of the pivot frames F3 by four fastening members 38 such as bolts.

The seat frame SF has a tank supporting portion 43 supporting a rear end portion of the fuel tank 2 provided at an upper portion thereof. The seat frame SF receives a load from above since it supports a rear portion of the fuel tank 2, the front seat 7, and the rear seat 29 and, in addition, receives loads in multiple directions since it supports the rear carrier 27, the rear cowl 28, the pillion footstep holders 31, a pannier not depicted, and the like.

Figure 3:
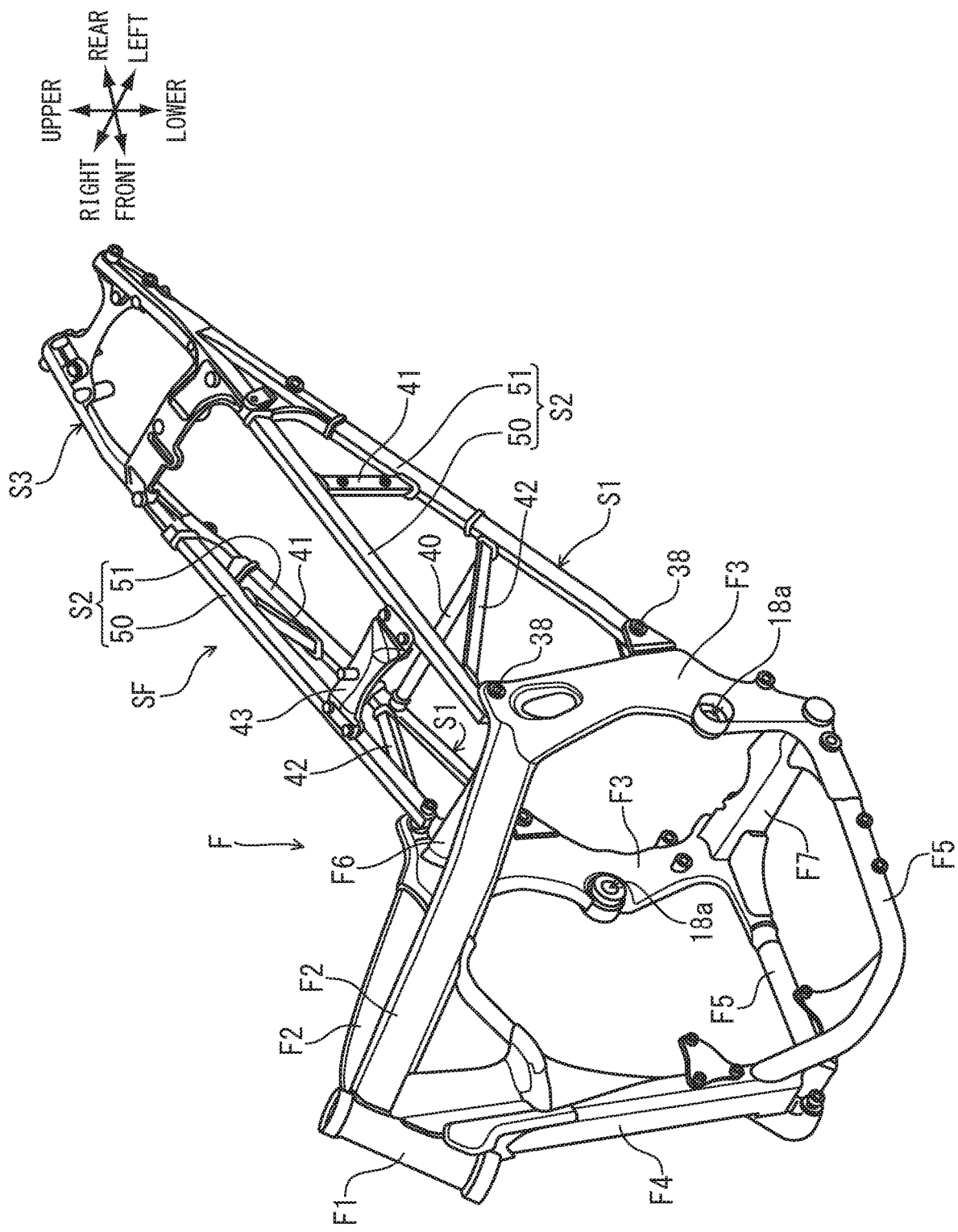
FIG. 3 is a perspective view of the vehicle body frame F.

FIG. 3 is a perspective view of the vehicle body frame F. The head pipe F1 has the pair of left and right main frames F2 connected to a rear surface thereof at an upper-side position, and a front frame F4 connected to the rear surface thereof at a lower-side position, the front frame F4 extending downward from a center of the rear surface of the head pipe F1 in the vehicle widthwise direction. The main frames F2 have the pair of left and right pivot frames F3 connected at the rear end portions thereof, the pivot frames F3 each having a supporting hole 18a for the pivot 18. The front frame F4 has a pair of left and right underframes F5 connected at a lower end portion thereof, the underframes F5 extending toward a rear side of the vehicle body so as to cover a lower portion of the engine E. The underframes F5 have rear end portions connected to lower end portions of the pivot frames F3. The left and right pivot frames F3 are connected to each other by an upper cross frame F6 and a lower cross frame F7 each extending in the vehicle widthwise direction.

The head pipe F1, the main frames F2, the pivot frames F3, the front frame F4, the underframes F5, and the like are each formed of a high tensile strength steel and welded to one another to form a front-side portion of the vehicle body frame F. In contrast, the seat frame SF mounted to the rear portions of the main frames F2 by the fastening members 38 includes aluminum parts only.

The seat frame SF according to the present embodiment includes front members S1 positioned on a front side in the vehicle longitudinal direction, middle members S2 connected to rear portions of the front members S1, and a rear member S3 connected to rear portions of the middle members S2, and has a feature in that the front members S1, the middle members S2, and the rear member S3 are formed of aluminum members manufactured in different manufacturing methods.

Specifically, the front members S1 mounted to lower-side positions of the pivot frames F3 by the fastening members 38 and extending toward the rear upper side are each formed of a forging obtained as a result of cold forging or hot forging. The middle members S2 each include an elongate upper middle member 50 mounted to an upper-side position of the pivot frame F3 and extending toward the rear upper side, and a lower middle member 51 connected to a rear end portion of the front member S1 and extending toward the rear upper side. The upper middle members 50 and the lower middle members 51 constituting the middle members S2 are each formed of a square pipe member obtained as a result of extruding or drawing. The rear member S3 supported by rear end portions of the upper middle members 50 and rear end portions of the lower middle members 51 is formed by integral molding based on a gravity casting method. Accordingly, the seat frame SF can satisfy required performances such as strength, weight, appearance, accuracy, manufacturing cost, and the like according to application places in a further ideal manner.

Between the upper middle member 50 and the lower middle member 51, a first vertical cross member 41 inclined toward the rear side of the vehicle body and vertically connecting the upper middle member 50 and the lower middle member 51 is disposed. Between the upper middle member 50 and the front member S1, a second vertical cross member 42 inclined toward the front side of the vehicle body and vertically connecting the upper middle member 50 and the front member S1 is disposed. At a position of the front member S1 near the rear end portion thereof, a horizontal cross member 40 oriented in the vehicle widthwise direction and connecting the left and right front members S1 is disposed. Spanned between the left and right upper middle members 50 is the tank supporting portion 43.

Figure 4:
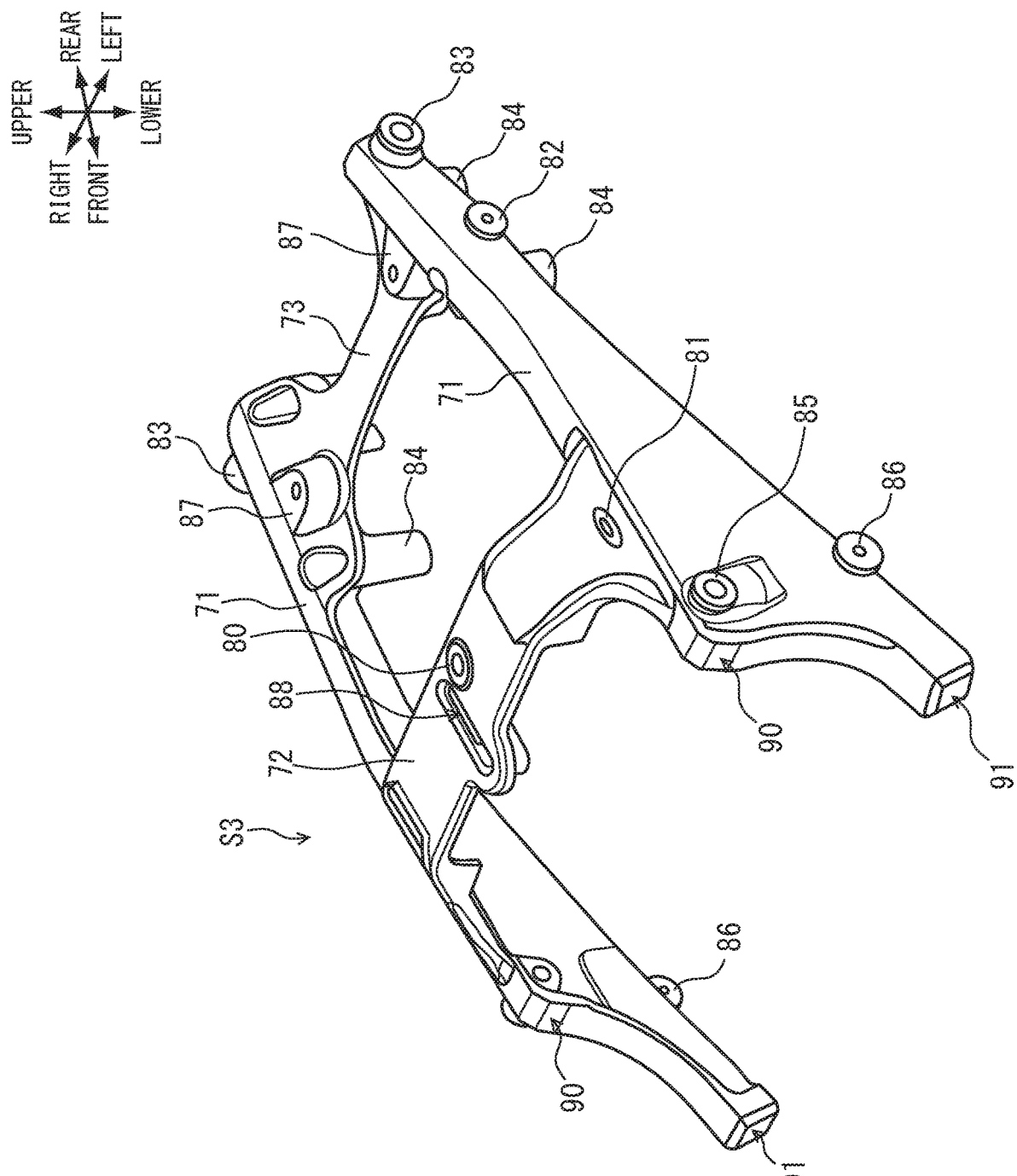
FIG. 4 is a perspective view of the rear member.

FIG. 4 is a perspective view of the rear member S3. The rear member S3 formed by integral molding based on the gravity casting method has a complex shape having appropriate wall thicknesses, lengths, and the like at respective parts thereof. The rear member S3 includes a pair of left and right rail portions 71 extending in the vehicle longitudinal direction, a front cross portion 72 extending in the vehicle widthwise direction on the front side in the vehicle longitudinal direction and connecting the left and right rail portions 71, and a rear cross portion 73 extending in the vehicle widthwise direction on a rear side in the vehicle longitudinal direction and connecting the left and right rail portions 71.

The front cross portion 72 has an attachment boss 80 for a seat catching mechanism (not depicted) and an insertion hole 88 in which a hook (not depicted) held by the seat catching mechanism is inserted formed at a center thereof in the vehicle widthwise direction. At positions of the front cross portion 72 near outsides in the vehicle widthwise direction, attachment bosses 81 for a pair of left and right seat belts are formed.

At positions of the rear cross portion 73 near outsides in the vehicle widthwise direction, rubber attachment bosses 87 supporting a bottom portion of the rear seat 29 are formed. On lower surface sides of the rubber attachment bosses 87, four rear fender attachment bosses 84 protruding downward from front and rear positions having the rubber attachment bosses 87 interposed therebetween and supporting the rear fender 25 (see FIG. 1) are formed.

The rail portions 71 are each shaped such that a vertical width thereof gradually increases toward the front side of the vehicle body. The rail portion 71 has a rear carrier attachment boss 85 for attaching a front end portion of the rear carrier 27 formed at an upper end portion on a front-side surface thereof. The rail portion 71 has a rear fender attachment boss 86 for attaching a front end portion of the rear fender 25 formed at a position below the rear carrier attachment boss 85 on the front-side surface thereof.

The rail portion 71 has an upper attachment portion 90 attached to the upper middle member 50 formed on a front end surface thereof on an upper side. The rail portion 71 has a lower attachment portion 91 attaching the lower middle member 51 formed on the front end surface thereof which protrudes forward compared to the upper attachment portion 90 on a lower side. The upper attachment portion 90 and the lower attachment portion 91 can function as positioning protrusions engaged with hollow holes of the upper middle member 50 and the lower middle member 51 which are formed of square pipe members.

In the gravity casting method in which molten aluminum is poured into a mold by gravity, the pouring speed is low, whereby gas is prevented from being entrained into the aluminum, which is suitable for producing a part with a complex shape by integral molding. In the rear member S3 positioned at a rear end of the seat frame SF, it is necessary to arrange attachment bosses for attaching parts such as a rear fender, a rear carrier, and a seat catch with high accuracy while securing a sufficient strength for supporting the weights of an occupant seated on the rear seat 29, the pannier, and the like. It is therefore preferable to manufacture the rear member S3 by the gravity casting method even if it costs high to some extent.

Figure 5:
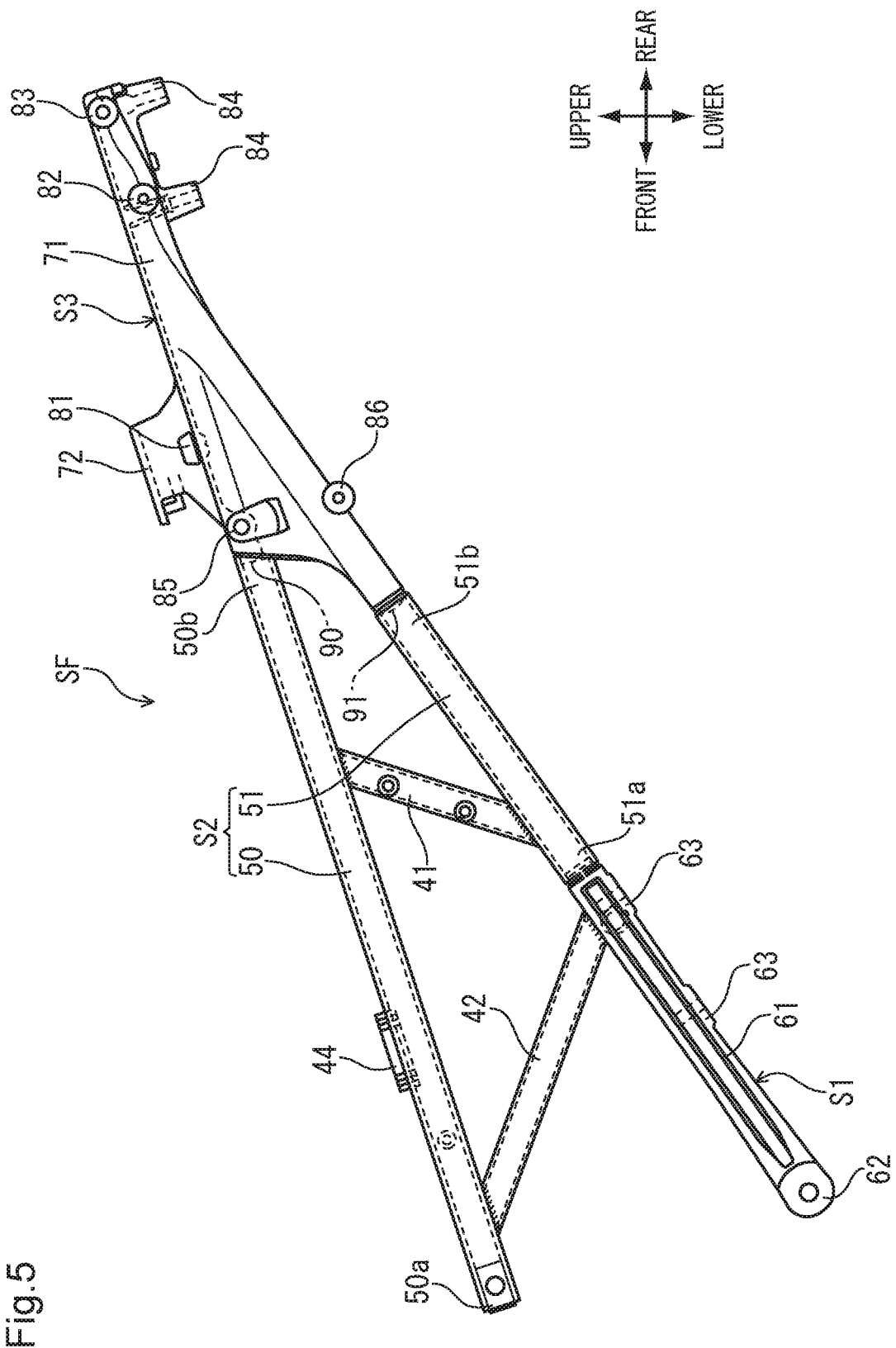
FIG. 5 is a left side view of the seat frame.
Figure 6:
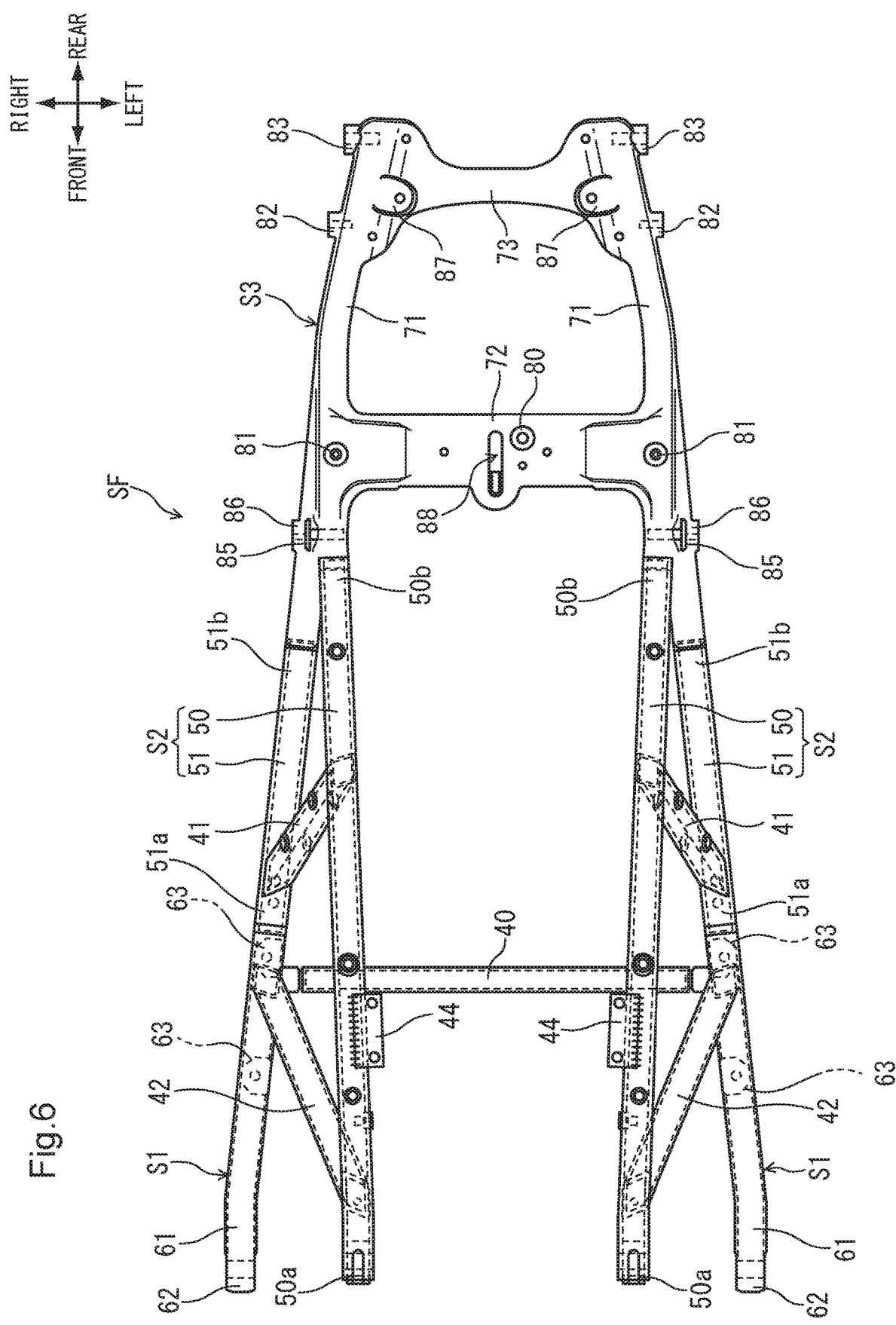
FIG. 6 is a plan view of the seat frame.

FIG. 5 is a left side view of the seat frame SF. FIG. 6 is a plan view of the seat frame SF. The middle members S2 include the upper middle members 50 arranged in a left-right pair in the vehicle widthwise direction and the lower middle members 51 arranged in a left-right pair in the vehicle widthwise direction, and the upper middle members 50 and the lower middle members 51 are each formed of a square pipe member obtained as a result of extruding or drawing. Specifically, since a pipe member obtained as a result of extruding or drawing can be mass produced with low manufacturing cost, it is suitably used for an elongate part having a uniform cross section. The middle members have increased strength because of its truss structure and the like, and vibrations are absorbed by deflection of the elongate portions, for example. Accordingly, the middle members are preferably formed of pipe members. The elongate upper middle members 50 have a pair of left and right support plates 44 for attaching the tank supporting portion 43 welded on upper surfaces thereof.

The upper middle member 50 has a rear end portion 50b welded to the upper attachment portion 90 of the rear member S3. The lower middle member 51 has a rear end portion 51b welded to the lower attachment portion 91 of the rear member S3. The upper middle member 50 is longer than the lower middle member 51, and the upper middle member 50 and the lower middle member 51 are oriented in the vehicle longitudinal direction such that a vertical distance therebetween decreases toward the rear side of the vehicle body in a vehicle side view. According to this arrangement, the upper attachment portion 90 disposed on the rail portion 71 of the rear member S3 is positioned closer to the rear side in the vehicle longitudinal direction compared to the lower attachment portion 91.

Accordingly, the weight of an upper portion of the rear member S3 can be reduced. Since the upper middle member 50 is longer in total length than the lower middle member 51, a vibration can be absorbed by deflection of the upper middle member 50 to be suppressed from being transmitted to the front seat 7 and the rear seat 29, thereby enhancing ride comfort.

Further, the upper attachment portion 90 is positioned inside the lower attachment portion 91 in the vehicle widthwise direction. Accordingly, a horizontal distance between the left and right upper middle members 51 is smaller than a horizontal distance between the left and right lower middle members 50, and therefore, a rider can straddle a seat more easily and the legs can reach the ground more easily.

The upper middle member 50 has a front end portion 50a mounted to the upper-side position of the pivot frame F3 by one of the fastening members 38. The lower middle member 51 has a front end portion 51a welded to the rear end portion of the front member S1. A main body portion 61 constituting the front member S1 has a front end portion 62 mounted to the lower-side position of the pivot frame F3 by another one of the fastening members 38.

Figure 7:
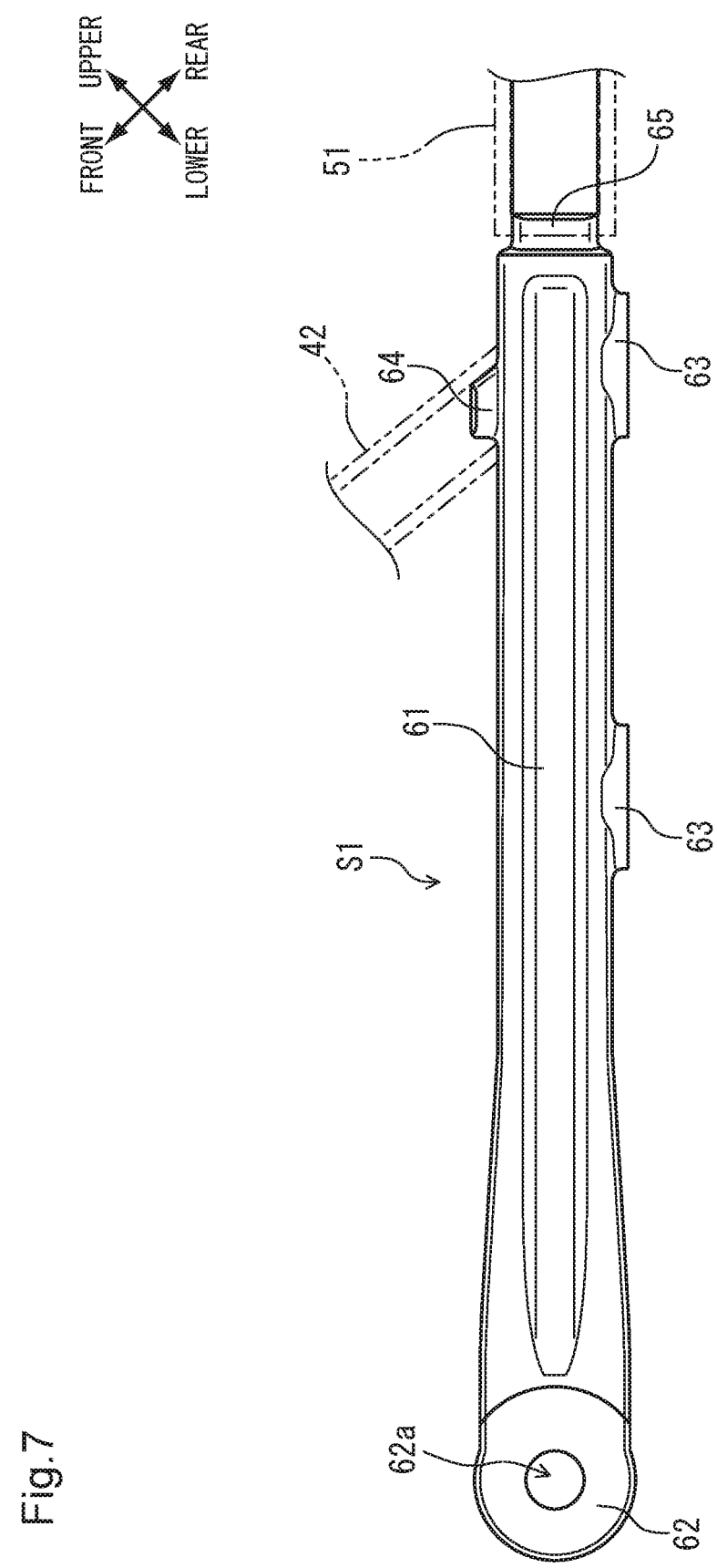
FIG. 7 is a side view of the front member on the left side in the vehicle widthwise direction.
Figure 8:
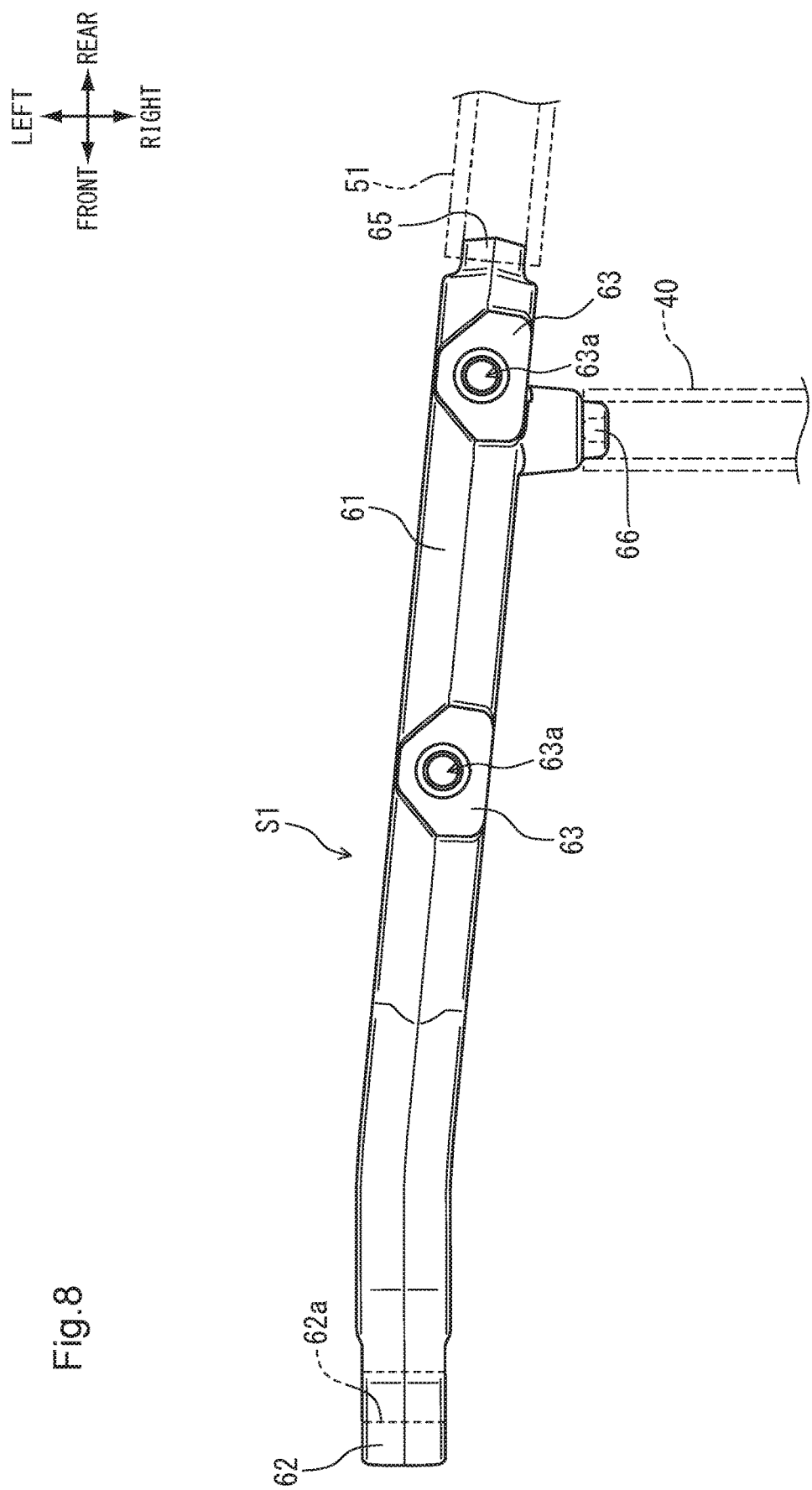
FIG. 8 is a bottom view of the front member on the left side in the vehicle widthwise direction.

FIG. 7 is a side view of the front member S1 on the left side in the vehicle widthwise direction. FIG. 8 is a bottom view of the front member S1 on the left side in the vehicle widthwise direction. The front members S1 are a pair of left and right elongate members obtained as a result of cold forging or hot forging. The front members S1 each have a solid structure unlike the middle members S2 formed of square pipe members. Forgings obtained as a result of cold forging or hot forging are suitably used for parts requiring high strength and toughness. The front members S1 supporting loads at front lower portions of the seat frame SF are preferably formed of forgings. Further, since forgings having smooth surfaces are superior also in appearance, the motorcycle can have an appearance of high quality by exposing the front members externally.

The front member S1 has a rear connection protrusion 65 inserted into the front end portion 51a of the lower middle member 51 formed at the rear end portion thereof. The front member S1 has the front end portion 62 mounted to the pivot frame F3 with the fastening member 38 passing through a through-hole 62a. Since forgings also offer high formation accuracy, which leads to increased accuracy in forming the upper connection protrusion 65, the middle member S2 is positioned with increased accuracy in connecting the middle member S2 by welding.

As mentioned above, the seat frame SF includes the first vertical cross members 41 vertically connecting the upper middle members 50 and the lower middle members 51, the second vertical cross members 42 vertically connecting the front members S1 and the upper middle members 50, and the horizontal cross member 40 oriented in the vehicle widthwise direction and connecting the left and right front members S1. The first vertical cross members 41, the second vertical cross members 42, and the horizontal cross member 40 are each formed of a square pipe member or a round pipe member. Accordingly, it is possible to suppress an increase in weight by using pipe members while enhancing the rigidity of the seat frame by connecting the front members to each other, connecting the middle members to each other, and connecting the front member and the middle member to each other.

The front member S1 has an inside connection protrusion 66 inserted into an end portion of the horizontal cross member 40 formed on an inside surface thereof in the vehicle widthwise direction. The front member S1 has an upper connection protrusion 64 inserted into an end portion of the second vertical cross member 42 on an upper surface thereof. Accordingly, provision of the connection protrusions on the front members having high strength enhances the positioning accuracy and the connection strength of the horizontal cross member and the second vertical cross members.

The front member S1 has an attachment portion 63 for the pillion footstep holder 31 on a lower surface thereof. The two attachment portions 63 each having a female screw hole 63a are disposed at positions near connection portions at which the horizontal cross member 40 and the second vertical cross members 42 are connected to the front members S1. Accordingly, the front members S1 themselves have increased strength and, in addition, the pillion footsteps 32 achieve enhanced load resistance since the pillion footstep holders 31 are mounted at positions reinforced by the horizontal cross member 40 and the second vertical cross members 42.

The mode of the motorcycle, the shape and the structure of the vehicle body frame, the shape and the structure of the seat frame, the shapes and the structures of the front members, the middle members, and the rear member, the shape and the structure of the fastening members, the shapes and the structures of the connection portions among respective portions, and the like are not limited to those in the embodiment, and various modifications are possible. The seat frame according to the present embodiment is applicable to a three-wheeled vehicle having two front wheels or two rear wheels.

EXPLANATION OF SIGN

1 . . . motorcycle, F . . . vehicle body frame, F2 . . . main frames, F3 . . . pivot frames, SF . . . seat frame, S1 . . . front members, S2 . . . middle members, S3 . . . rear member, 31 . . . pillion footstep holders, 38 . . . fastening members, 40 . . . horizontal cross member, 41 . . . first vertical cross members, 42 . . . second vertical cross members, 50 . . . upper middle members, 51 . . . lower middle members, 50b . . . rear end portion, 51a . . . front end portions, 51b . . . rear end portions, 62 . . . front end portion, 63 . . . attachment portion for the pillion footstep holder, 64 . . . upper connection protrusion, 65 . . . upper connection protrusion, 66 . . . inside connection protrusion, 71 . . . rail portions, 72 . . . front cross portion, 73 . . . rear cross portion, 80, 81, 82, 83, 84, 85, 86, 87 . . . attachment boss, 90 . . . upper attachment portions(attachment portions), 91 . . . lower attachment portions(attachment portions)

The invention claimed is:

1. A seat frame for a motorcycle including a plurality of parts connected to one another to form an integral structure and mounted to a rear portion of a vehicle body frame, the seat frame comprising:
    front members disposed on a front side in a vehicle longitudinal direction;
    middle members connected to rear portions of the front members; and
    a rear member connected to rear portions of the middle members,
    wherein the front members, the middle members, and the rear member are formed of aluminum members manufactured with different manufacturing methods,
    wherein the rear member is formed by integral molding based on a gravity casting method,
    wherein the rear member includes a pair of left and right rail portions extending in the vehicle longitudinal direction, a front cross portion extending in a vehicle widthwise direction on the front side in the vehicle longitudinal direction and connecting the left and right rail portions, a rear cross portion extending in the vehicle widthwise direction on a rear side in the vehicle longitudinal direction and connecting the left and right rail portions, and a plurality of attachment bosses for attaching other parts, and
    wherein attachment portions to be connected to rear end portions of the middle members are provided on end portions on a front side in the vehicle longitudinal direction of the left and right rail portions.

2. The seat frame for a motorcycle according to claim 1,
    wherein the middle members include upper middle members arranged in a left-right pair in the vehicle widthwise direction, and lower middle members arranged in a left-right pair in the vehicle widthwise direction,
    wherein the attachment portions disposed on the rail portions of the rear member include a pair of left and right upper attachment portions mounted to the upper middle members, and a pair of left and right lower attachment portions mounted to the lower middle members, and
    wherein the upper attachment portions are positioned closer to the rear side in the vehicle longitudinal direction compared to the lower attachment portions.

3. The seat frame for a motorcycle according to claim 2,
    wherein the upper attachment portions are positioned inside the lower attachment portions in the vehicle widthwise direction.

4. The seat frame for a motorcycle according to claim 3,
    wherein the middle members are formed of a pipe member obtained as a result of extruding or drawing,
    wherein the upper middle members are longer than the lower middle members,
    wherein the upper middle member and the lower middle member are oriented in the vehicle longitudinal direction such that a vertical distance therebetween decreases toward the rear side of a vehicle body in a vehicle side view,
    wherein the upper middle members have rear end portions connected to the upper attachment portions of the rear member,
    wherein the lower middle members have rear end portions connected to the lower attachment portions of the rear member,
    wherein the upper middle members have front end portions mounted to pivot frames of the vehicle body frame, and
    wherein the lower middle members have front end portions connected to the front members.

5. The seat frame for a motorcycle according to claim 4,
    wherein the front members are a pair of left and right elongate members obtained as a result of cold forging or hot forging,
    wherein rear connection protrusions inserted into the front end portions of the lower middle members are formed at rear end portions of the front members, and
    wherein the front members have front end portions mounted to the pivot frames by fastening members.

6. The seat frame for a motorcycle according to claim 5,
    wherein the seat frame includes first vertical cross members vertically connecting the upper middle members and the lower middle members, second vertical cross members vertically connecting the front members and the upper middle members, and a horizontal cross member oriented in the vehicle widthwise direction and connecting the left and right front members, and
    wherein the first vertical cross members, the second vertical cross members, and the horizontal cross member are each formed of a pipe member.

7. The seat frame for a motorcycle according to claim 6,
    wherein inside connection protrusions inserted into end portions of the horizontal cross member are formed on inside surfaces in the vehicle widthwise direction of the front members, and
    wherein upper connection protrusions inserted to end portions of the second vertical cross members are formed on upper surfaces of the front members.

8. The seat frame for a motorcycle according to claim 6,
    wherein attachment portions for pillion footstep holders are provided on lower surfaces of the front members.

9. The seat frame for a motorcycle according to claim 7,
    wherein attachment portions for pillion footstep holders are provided on lower surfaces of the front members.

10. The seat frame for a motorcycle according to claim 5,
    wherein attachment portions for pillion footstep holders are provided on lower surfaces of the front members.

* * * * *